(12) United States Patent
Kohler

(10) Patent No.: US 8,977,393 B1
(45) Date of Patent: Mar. 10, 2015

(54) METHODS AND SYSTEMS FOR CHARGING A ROBOTIC DEVICE

(75) Inventor: Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 226 days.

(21) Appl. No.: 13/612,218

(22) Filed: Sep. 12, 2012

(51) Int. Cl.
*H02J 7/02* (2006.01)

(52) U.S. Cl.
USPC .......................................... 700/248; 320/107

(58) Field of Classification Search
USPC .......... 700/245, 248, 259; 320/107, 137, 109, 320/166, 115
See application file for complete search history.

(56) References Cited

U.S. PATENT DOCUMENTS

| | | | |
|---|---|---|---|
| 6,157,162 A | 12/2000 | Hayashi et al. | |
| 6,480,761 B2 * | 11/2002 | Ueno et al. | 700/245 |
| 6,764,373 B1 * | 7/2004 | Osawa et al. | 446/175 |
| 7,825,633 B2 | 11/2010 | Udono | |
| 7,834,584 B2 * | 11/2010 | Koyanagi et al. | 320/107 |
| 8,442,682 B2 * | 5/2013 | Wagner | 700/258 |
| 8,515,580 B2 * | 8/2013 | Taylor et al. | 700/259 |
| 2004/0201361 A1 | 10/2004 | Koh et al. | |
| 2006/0043929 A1 | 3/2006 | Koyanagi et al. | |
| 2008/0174268 A1 | 7/2008 | Koo et al. | |
| 2011/0295420 A1 | 12/2011 | Wagner | |

OTHER PUBLICATIONS

NAO Robot Charging Station, available at http://www.youtube.com/watch?v=b0Rx017wA54&feature=related, retrieved on Sep. 12, 2012.
Vision-Based Autonomous Robot Self-Docking and Recharging, available at http://www.youtube.com/watch?v=FYKjiYEqJPQ, retrieved on Sep. 12, 2012.
Docking Station for Autonomous Robot Recharging, available at http://robotics.usc.edu/~boyoon/docking.html, retrieved on Sep. 12, 2012.
Staying Alive: A Docking Station for Autonomous Robot Recharging, available at http://www.mendeley.com/research/staying-alive-a-docking-station-for-autonomous-robot-recharging/#page-1, retrieved on Sep. 12, 2012.

* cited by examiner

*Primary Examiner* — Dalena Tran
(74) *Attorney, Agent, or Firm* — McDonnell Boehnen Hulbert & Berghoff LLP

(57) ABSTRACT

Methods and systems for robotic device charging are described. Within examples, a robotic device may be any device that has a computing ability and interacts with its surroundings with an actuation capability (e.g., electromechanical capabilities). In some examples, a robotic device may be configured to receive a second device, such as a mobile phone, that may be configured to function as necessary as an accessory or a "brain" of the robotic device. A power source apparatus may be any apparatus able to distribute charge in some form in any method to a device wanting charge, including robotic devices.

19 Claims, 8 Drawing Sheets

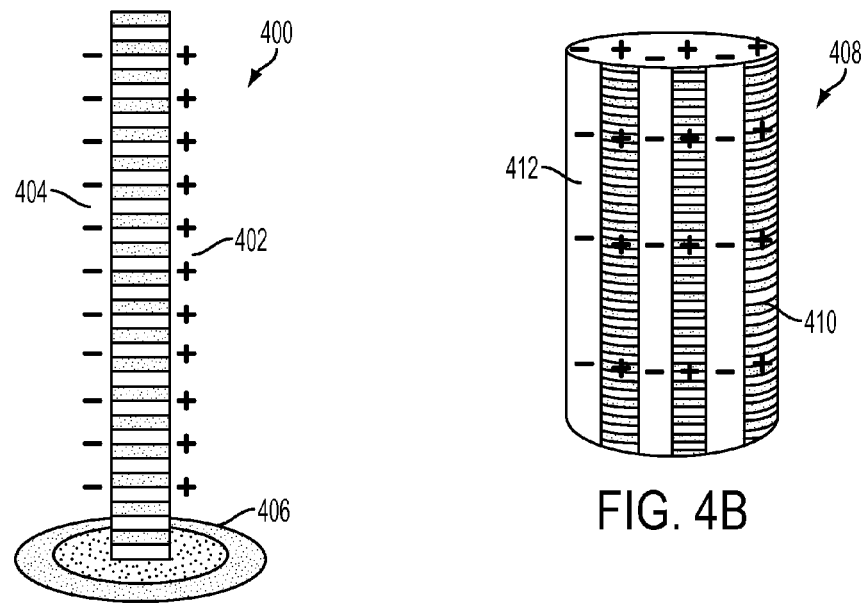
FIG. 4A
FIG. 4B
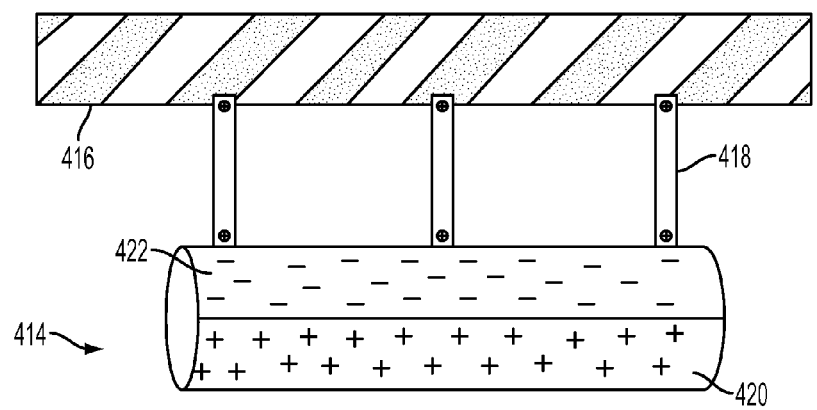
FIG. 4C

METHODS AND SYSTEMS FOR CHARGING A ROBOTIC DEVICE

BACKGROUND

Robotic systems are becoming increasingly available for use in various environments for numerous reasons. Robotic devices may exist in a plurality of forms and assist humans with a plurality of roles, including but not limited to roles involving danger, precision, and repetition. Environments that robotic devices may operate in include homes, workplaces, factories, and other places that robotic devices may assist humans.

Typically, robotic devices have similar components with some components having unique features for performing certain tasks. A robotic device usually has a control unit to execute instructions and may have members to help complete tasks. Some examples of members include arms, wings, or simple protrusions. A robotic device typically requires some form of power source in order to power the mechanical and electrical systems of the robotic device. In some examples, the power source may be rechargeable, such as a battery. Frequently, the provided charging system requires the robotic device to dock or mount to receive a charge. These charging stations may require large amounts of floor space and may impact movement of humans or the robots in that region. Charging systems typically require a single robotic device to charge at a time due to space and structural limitations. Multiple robotic devices may have to wait for other robotic devices to finish charging before having an opportunity to charge.

SUMMARY

This disclosure may disclose, inter alia, methods and systems for robotic device charging.

In one example, a method is provided that includes coupling a member of a robotic device to a terminal of a power source. The member may be a mechanical manipulator coupled to a base of the robotic device, and may be configured to move relative to the base of the robotic device according to programmable instructions. The member may include a first portion and a second portion movably coupled to each other. The first portion and second portion of the member may include at least one electrical contact and may be configured to receive an electrical charge. The method also comprises receiving an electrical charge from the power source through the member. For example, the electrical charge may enter the robotic device through the electrical contacts coupled to the power source.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices or systems may be used or configured to perform logical functions in any processes or methods described herein. As one example, a robotic device is provided comprising a member coupled to a base of the robotic device. The member may be an attached mechanical manipulator and may be configured to move relative to the base according to programmable instructions. The member includes a first portion and a second portion movably coupled to each other. The first portion and the second portion of the member may include electrical contacts. In addition, the first portion may include a first electrical contact configured to receive a first type of charge and the second portion may include a second electrical contact configured to receive a second type of charge. The robotic device may further include a control unit configured to control functions of the robotic device.

In yet another example, a system is provided comprising a plurality of robotic devices and a power source apparatus. Each robotic device includes at least one mobile manipulator member. As before, the member includes a first portion and a second portion movably coupled to each other and both portions may include electrical contacts configured to receive a type of charge. The power source apparatus comprises a plurality of terminals and each terminal is configured to provide an electrical charge. The power source apparatus is configured to couple to any planar surface and transfer the electrical charge to at least one member of at least one robotic device coupled to the terminal.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

In the Figures,

FIG. 4A illustrates a graphical example of a power apparatus;

FIG. 4B illustrates another example of a power apparatus;

FIG. 4C illustrates another example of a power apparatus;

all arranged in accordance with at least some embodiments described herein.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robotic device charging. Within examples, a robotic device may be any device that has a computing ability and interacts with its surroundings with an actuation capability (e.g., electromechanical capabilities). In some examples, a robotic device may be configured to receive a second device, such as a mobile phone, that may be configured to function as necessary as an accessory or a "brain" of the robotic device. The robotic device may be configured to interact with a power source apparatus to receive a charge. A power source apparatus may be any apparatus able to distribute charge to a device, including robotic devices.

In examples described herein, a robotic device may interact with the power source apparatus to charge in any number of ways, such as to receive a charge through conduction or induction. Within examples, a robotic device may interact with other robotic devices and may charge from a plurality of power source apparatuses.

1. Example System for Robotic Device Charging

Figure 1:
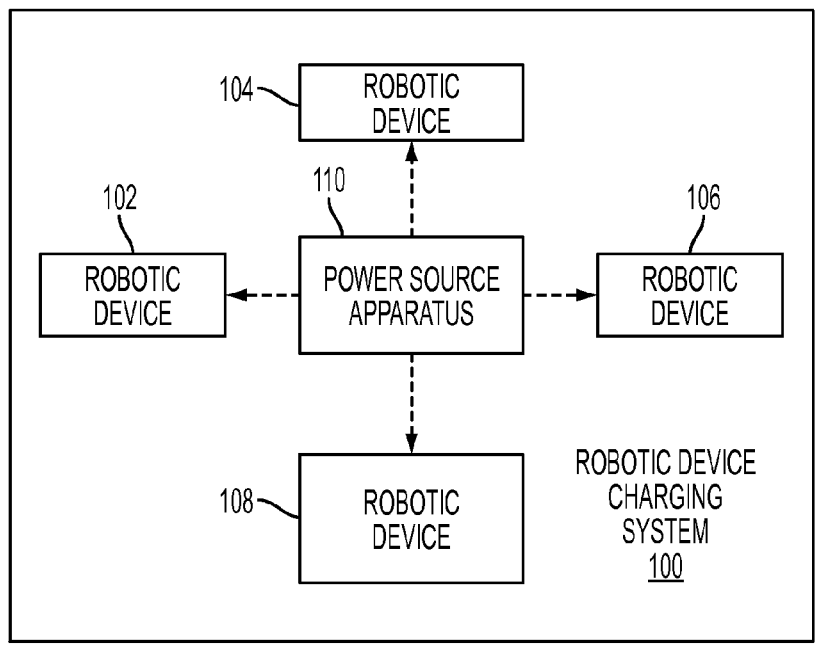
FIG. 1 is an example system for charging a robotic device.

Referring now to the figures, FIG. 1 illustrates an example system of a robotic device charging system 100. Other examples may include more or fewer components. In FIG. 1, the robotic device charging system 100 includes a plurality of robotic devices 102, 104, 106, and 108 and a power source apparatus 110. In the example, the robotic device 102 may use a member coupled to a base of the robotic device 102 to receive an electrical charge by coupling to the power source apparatus 110. The member may have one or more main functions that do not involve receiving a charge and may receive charge as an additional function. In some embodiments, a plurality of robotic devices may charge from the same power source apparatus simultaneously. In other examples, a single robotic device may charge alone. In other examples, the robotic device charging system 100 may contain multiple power source apparatuses.

In examples, the robotic device 102 may be configured for one or more tasks, such as floor cleaning, manual assembly, or others. In some embodiments, the robotic device 102 may be configured to assist humans, such as patients within a hospital or workers in a factory, etc. Types of example functions of robotic devices are numerous and any example is a possibility for robotic devices described herein. The robotic device 102 may have members designed specifically to perform these functions. By enabling functional members to also be able to receive an electrical charge for the robotic device 102 in addition to performing specific functions, the cost of the parts of the robotic device 102 may be kept at a minimum. This ability may prevent the need for an additional component or member that would be required in order to receive a charge for the robotic device 102.

In the example of FIG. 1, the dotted lines connecting the robotic devices and the power source apparatus 110 in the robotic device charging system 100 may represent the members of the robotic devices receiving a charge from the power source apparatus 110. The members may be any component of the robotic device that is configured to transfer a charge from the power source apparatus 110 to a power source of the robotic device. The members may be functioning components necessary for the robotic device 102 to function, or may be added to the robotic device 102 for receiving a charge. In another example, robotic device 102 may receive a charge from the power source apparatus 110 at a rate faster or slower than robotic device 106. In another example, robotic device 102 may receive a charge from the power source apparatus 110 at the same rate as robotic device 106. The transfer of electrical charge from the power source apparatus 110 to each robotic device may occur through induction, conduction, or any other method of charge transfer. In some examples, the power source apparatus 110 may transfer a charge to surrounding robots wirelessly via an electromagnetic field. The dotted lines in FIG. 1 symbolize a plurality of possibilities for transferring charge from the power source apparatus 110 to the robotic devices 102, 104, 106, and 108.

The power source apparatus 110 may exist in a variety of sizes and forms. In some examples, the power source apparatus 110 may be electrical-socket on a wall, a battery, a generator, or another means of charging a device. In other examples, a power source apparatus may be a wire connected directly to an electrical power grid. Different environments may require different types of power source apparatuses. A power source apparatus may have specific features that enable the apparatus to operate within a water-type environment, for example.

In one example of the robotic device charging system 100, the power source apparatus 110 may provide a charge to a plurality of robotic devices. The power source apparatus 110 may provide an electrical charge that a robotic device 102 may use. The power source apparatus 110 may provide a voltage difference or create one through induction. For example, power may be provided in the form of energy through inductive coupling between a robotic device and power source apparatus. In some examples, a specific amount of current may flow from the power source apparatus 110 between the voltage difference in order to provide a charge for the robotic device 102 to receive. The rate a robotic device 102 may receive charge from a power source apparatus may vary due to the type of robotic device and the type of power source apparatus. In an example, the power source apparatus 110 may charge a plurality of robotic devices simultaneously. In another example, the robotic devices may charge from the power source apparatus 110 in a predetermined order. The predetermined order may include charging the robotic devices in the order that each robotic device needs a charge or in the order that each robotic device coupled to the power source apparatus 110. Robotic devices may have the ability to communicate with each another to determine the order each device should receive charge.

2. Example Architecture of a Robotic Device

Figure 2:
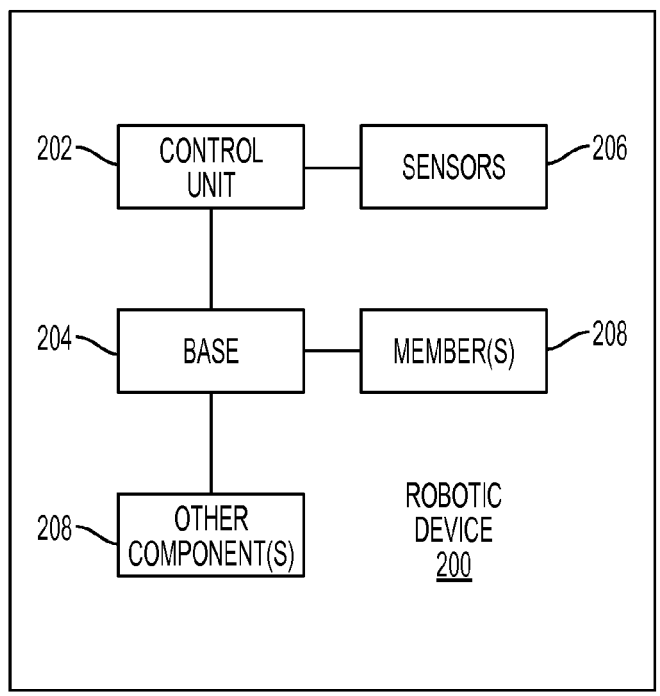
FIG. 2 illustrates an example component composition of a robotic device.

FIG. 2 illustrates an example of the architecture of a robotic device 200. The robotic device 200 may operate in a robotic device charging system 100 in FIG. 1. Other architectures may be used to represent the robotic device 200. The configuration of the boxes in FIG. 2 is merely a symbolic representation of the robotic device 200 and may involve more or fewer components organized in a different manner. The example in FIG. 2 illustrates a robotic device 200 including a control unit 202, a base 204, sensors 206, and members 208. Other examples may include more or fewer components. In some embodiments, the robotic device 200 may contain additional elements to improve the intelligence and functionality of the device. The robotic device 200 may be configured to perform a variety of functions, including complicated roles. In addition, the robotic device 200 may assist humans in a variety of tasks including dangerous or repetitious tasks and may operate in an assortment of environments.

The robotic device 200 in FIG. 2 may have the control unit 202 that configures the robotic device 200 to execute instructions or software. The control unit 202 may additionally configure the robotic device in various other ways. The control unit 202 may exist internally within the robotic device 200, or may function separately from the robotic device 200. The control unit 202 may include or take the form of a computing device, tablet, mobile phone, or another electronic device that couples to the robotic device 200. A user may have the ability to program instructions for the robotic device 200 or may be able to download applications to run on the control unit 202. In some examples, the control unit 202 may be remotely operated by a user or software. Additionally, the control unit 202 may control the motion of the robotic device 200, including the functions of the member 208. In some examples, the control unit 202 may control the intelligence of the robotic device 200. The control unit 202 may provide additional memory storage and processors to help perform executions. In one embodiment, the control unit 202 may have the ability to store certain routes and other factors that may improve the ability of the robotic device 200 to locate and utilize a power source apparatus. The control unit 202 may provide functions of gauges and measurements necessary to track an amount of power the robotic device 200 may have available. The control unit 202 may also monitor the member in a number of ways including monitoring the amount of charge entering the member, a rate the charge is entering, and changes the member may need to make to receive charge, etc. In some examples, the control unit 202 may change locations of a member to better adapt the power source apparatus. In these examples, the control unit 202 may reconfigure an electrical contact to accept a different type of charge, or reconfigure a portion of that electrical contact.

The robotic device 200 of the example illustrated in FIG. 2 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples. A robot operating system may include publish and subscribe functionality, and may also include functionality to control components of the robot, such as head tracking, base movement (e.g., velocity control, navigation framework), etc.

In some examples, a robotic device 200 may have one or more members 208 to perform various functions. The robotic device 200 may utilize the member 208 to perform one or more functions. The member 208 may have specific functions to perform and in addition to these functions, allow the robotic device 200 to receive an electrical charge from a power source apparatus. Some example functions include charging from a power source apparatus, grabbing tools, moving matter, and delivering goods, etc. These members may include but are not limited to, mechanical wings, arms, legs, robotic mouths, and springs, etc. A plurality of members 208 may function cooperatively to improve the abilities of the robotic device 200. In other embodiments, each member of a robotic device can be configured to perform functions regardless of the activities of the other members 208. In some embodiments, the member 208 may have two ends with one end coupled to the base 204 of the robotic device 200. The member 208 may be attached to the base 204 via a joint, a socket, welded, or another form of connection and may be composed of a variety of materials including aluminum, plastic, or steel. In examples, the member 208 of the robotic device 200 may have the ability to move in any direction and at any angle allowing the robotic device 200 to reach a power source apparatus in different locations. The joints, sockets, and other forms of connections enable the member 208 to move in various motions in any direction. In the example of FIG. 2, the member 208 of the robotic device 200 may have the ability to move and couple to a power source apparatus connected to the ceiling of a room. In another example, the member 208 of the robotic device 200 may couple to receive a charge from a vertically aligned power source apparatus.

The example of architecture of the robotic device 200 includes the possibility of additional components. Other components may include any robotic equipment that improves the performance of a robotic device 200 or enables additional functionality. The additional components or devices may allow the robotic device 200 to interact with an environment. In one embodiment, a robotic device 200 may contain a balancing component that may help optimize the functionality of the device. Examples of other components include wheels, springs, and lasers. Robotic device 200 may include one or more various types of induction coils to allow the reception of power wirelessly from an electromagnetic field. The robotic device 200 may also include a power source, such as a battery that can be recharged using a power source apparatus. In one example, a robotic device 200 may have storage that is used for compiling data from the various sensors 206 of the robot and storing program instructions. Example sensors may include, smoke sensors, light sensors, radio sensors, infrared sensors, microphones, speakers, gyroscope, accelerometer, a camera, radar, capacitive sensors, and touch sensors, etc.

In some examples, various sensors 206 and devices on the robotic device 200 may be modules. Different modules may be added or removed from a robotic device 200 depending on requirements. For example, in a lower power situation, a robotic device may have fewer members 208 to reduce power usages. Adding the ability to receive a charge to an already functioning member 208 may keep the number of parts of the robotic device to a minimum and help lower costs of the robotic device 200. However, additional sensors and modules may be added as needed. To increase an amount of a data a robotic device may be able to collect, additional sensors 206 and gauges may be added, for example.

In various examples, the robotic device 200 may be configured to receive a device, such as a mobile phone, and the mobile phone may include the sensors 206 and the control unit 202. For example, the robotic device 200 may have a number of members 208, and the robotic device 200 may be configured to receive a mobile phone to function as the "brains" or the control unit 202 of the robotic device. For example, a mobile phone may sit on the base 204 of the robotic device 200 and form an interactive display. The mobile phone may provide a robotic device with sensors, a wireless link, and processing capabilities, for example. The mobile phone may allow a user to download new routines for his or her robotic device from a cloud of resources. For example, a laundry folding routine may be stored on the cloud, and a user may be able to select this routine using a mobile phone to download the routine from the cloud, and when the mobile phone is placed into or coupled to the robotic device, the robotic device would be able to perform the downloaded action. The mobile phone may enable a user with additional control to program a robotic device.

3. Example of Robotic Devices

Figure 3A:
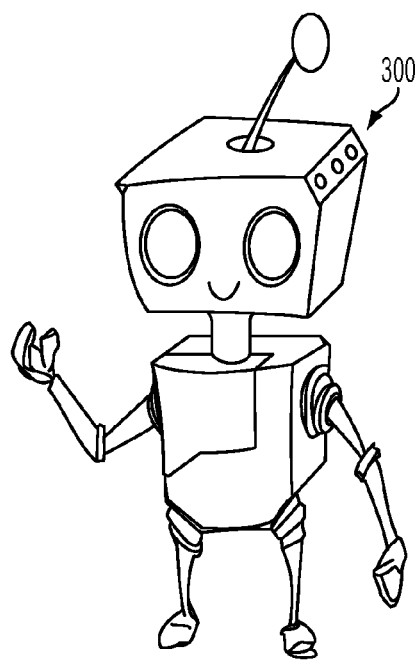
FIG. 3A illustrates a graphical example robotic device.
Figure 3B:
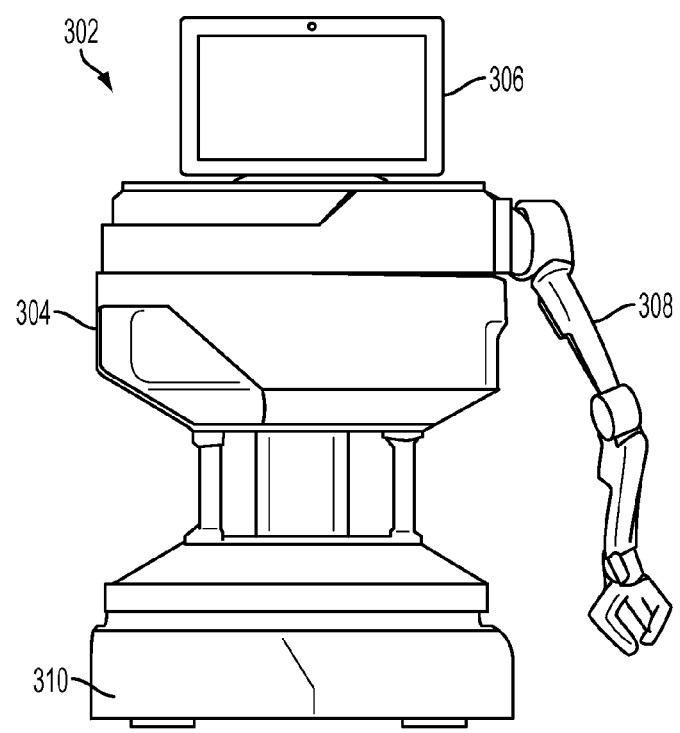
FIG. 3B illustrates another example of a robotic device.

FIGS. 3A and 3B illustrate possible examples of robotic devices. These examples as well as other example robotic devices may operate in the robotic device charging system 100. The robotic devices in the FIGS. 3A and 3B may have the same components of robotic device 200, or may also include more or fewer components.

FIG. 3A illustrates a graphical example of a robot 300. In FIG. 3A, the robotic device 300 is shown as a mechanical form of a person including arms, legs, a mouth, and a head. The robotic device 300 may be configured to receive any number of modules or components, such as a mobile phone, which may operate the robot. The robotic device 300 may be configured to perform a plurality of tasks and operate in various environments. The robotic device 300 in FIG. 3A has multiple members including two mechanical arms that have grippers on the end of the mechanical arms. In the example in FIG. 3A, the grippers may act similarly to a human hand. In some examples, the robotic device 300 may charge by coupling one or more members to a power source apparatus. In one example, the robotic device 300 may charge by grabbing a power source apparatus via one gripper on the end of one of the functional arms. Additional examples may have the robotic device 300 receive charge by coupling a mouth, head, base, or other component to the power source apparatus. The robotic device 300 of FIG. 3A illustrates examples of functional members that may also be used to receive charge for the robotic device 300.

FIG. 3B illustrates another example of a robotic device 302. The robotic device 302 includes a base 204, a control unit 306, a member 308, and other components including wheels 310, for example. Other examples may illustrate the robotic device 302 including multiple members, and more or fewer components. In some examples, the robotic device 302 may operate similarly to the robotic device 300 of FIG. 3A. In the example of FIG. 3B, the control unit 306 may include a tablet computer, a mobile phone, or another electronic device, which may be coupled to sensors and the base 304. The sensors may include a camera, infrared projectors, and other motion sensing or vision sensing elements. The control unit 306 of robotic device 302 may operate similarly to any of the examples presented in according to FIG. 2.

The member 308 may include mechanical joints, multiple parts, one or more grippers, electrical contacts, motors, or other components to perform specific functions. FIG. 3B illustrates the robotic device 302 with a mechanical manipulator operating as the member 308. The member 308 may perform specific tasks or functions. For example, the member 308 of FIG. 3B may have the ability to grab objects and move the objects. Other examples of members include legs, the mouth of the robotic device, or any portion of the robotic device that is able to couple to a power source apparatus. In the FIG. 3B, the member 308 may charge by coupling to a power source apparatus, or may charge by wrapping electrical contacts on certain portions of the power source apparatus. In other examples, the robotic device 302 may charge via air transfer by positioning its member 308 closely to the power source apparatus without coupling the apparatus.

In some examples, the base 304 may include wheels, motors, cooling systems, and other components. The member 308, control panel 306, and other components may couple to the base 304. The base 304 may be composed of a strong material including types of metal or aluminum. In other examples, the base 304 of the robotic system 300 may be plastic or another lightweight material. A base may have the ability to couple to a power source apparatus and receive an electrical charge.

The robotic devices of FIGS. 3A and 3B may include a wired or wireless network interface through which the robotic devices can connect to or communicate with a power source apparatus. As an example, the robotic devices and power source apparatuses may be configured to use one or more protocols such as 802.11, 802.16 (WiMAX), LTE, GSM, GPRS, CDMA, EV-DO, and/or HSPDA, among others. Furthermore, the robotic devices and power source apparatuses may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

4. Examples of Power Source Apparatuses

FIGS. 4A-4C illustrate examples of power source apparatuses. In the examples, each power source apparatus may vary in structure, power, size, and other features. Other examples of power source apparatuses may have more or fewer components. A power source apparatus may provide charge to objects including robotic devices, electronic appliances, and mobile devices. In some examples, a power source apparatus may receive charge to transfer to a robotic device from a main power source, such as a wall outlet. A power source apparatus may convert power from a wall outlet or battery to a charge level that robotic devices may properly receive. Other power source apparatuses may generate power internally to transfer to devices. For example, solar panels may capture energy from the sun and convert that energy into a usable source of charge for a robotic device. A power source apparatus may be designed to fit specific needs of the robotic charging system within which the power source apparatus operates. In some examples, a power source apparatus may be one of a plurality of power source apparatus organized in a system to maximize efficiency of robotic devices charging and functioning. Multiple power source apparatus may be positioned in corners of a large room to enable a robotic device to charge from the power source apparatus that is located closest at the time a charging is needed. Some power source apparatuses may be designed to take up minimal amounts of space while still allowing a plurality of robotic devices to charge simultaneously. In one example, a power source apparatus may be attached to the ceiling to enable robotic devices to charge and still have access to the entire area of floor space. In some embodiments, a power source apparatus may provide plugs or other components that devices may plug into. A user may use a power source apparatus to charge robotic devices while also powering household devices, including televisions, cell phone charges, and lamps, etc.

FIG. 4A is an example of power source apparatus 400 coupled to a planar surface 406. The power source apparatus 400 may operate in a plurality of locations and may couple to any planar surface 406. Other examples may similarly compare to the power source apparatus 400 in FIG. 4A with more or fewer variance in build and operation.

The power source apparatus 400 may allow a plurality of robotic devices to charge at the same time. Robotic devices may couple to the power source apparatus 400 at different angles and locations to receive charge simultaneously. In one example, the power source apparatus 400 may output one type of charge 402 on one surface and another type of charge 404 on an opposite surface. The two surfaces of the power source apparatus 400 may also generate a voltage difference that permits a charge to be produced. Robotic devices may couple to both the first type of charge 402 and the second type of charge 404, or one of the charges to receive a charge depending on the abilities of the robotic device. The first type of charge 402 and second type of charge 404 may be positive, negative, or neutral in some cases. In some examples, the power source apparatus 400 may provide devices with a ground output to couple to while charging as well.

The power source apparatus 400 may communicate with the robotic device in a manner of methods, or may operate independently of interaction of the robotic device. In one example, the power source apparatus 400 may output a beacon signal that can be received by any robotic devices in the area notifying the robotic devices of a location of the power source apparatus 400.

In the FIG. 4A, a robotic device may couple only to the first type of charge 402, only to the second type of charge 404, or a combination of the charges. For example, one combination includes a robotic device connecting to a positive type of charge and ground to receive a charge from the power source apparatus 400. In some examples, when a robotic device uses an electrical contact or another means of receiving charge, the power source apparatus 400 may transmit charge through electrical contacts to the robotic device. The surface area of the electrical contacts may vary. Amounts of the first type of charge 402 and second type of charge 404 may vary during a period of time. In one example, the power source apparatus 400 may alternate outputting a positive charge at a certain value and outputting the reversed charge at a different value. In other examples, the power source apparatus 400 may transfer charge to the robotic device by different means, such as through induction or conduction. In one example, the power source apparatus 400 may use or include an induction coil to generate an alternating electromagnetic field and transfer power via the electromagnetic field to an induction coil coupled to a robotic device. The induction coil may convert the power from the electromagnetic field into electrical current to charge the battery of the robotic device.

In one embodiment, the power source apparatus 400 may output a constant charge within a certain range allowing instant access to charge by a coupling robotic device. In one example, the power source apparatus 400 may maintain a certain voltage difference to keep the charge output at a consistent value. In other examples, the power source apparatus 400 may output a low charge or no charge at all until the power source apparatus 400 senses a presence or connection of a robotic device. The power source apparatus 400 may communicate with robotic devices in numerous ways including, but not limited to wireless signals, image recognition, physical cues, or sound interaction. In one embodiment, the power source apparatus rests in an off-state not outputting power until a motion sensor detects a robotic device approaching for charge. In some examples, the power source apparatus 400 may include light emitting diodes (LEDs) or other types of lights to provide an indication of a location of the power source apparatus for convenience. By illuminating the power source apparatus 400, humans may avoid accidently bumping or touching the power source apparatus 400 in poor lighting situations.

One or more gauges, switches, or meters may also be coupled to the power source apparatus 400 to allow humans to monitor the functions of the power source apparatus 400. These one or more gauges, switches, or meters may also work with the power source apparatus 400 from a distance without physical connection. In some examples, the power source apparatus 400 may contain a display screen to show statistical data of the apparatus. The screen coupled to the power source apparatus 400 may be a touchscreen for user interaction.

FIG. 4A illustrates that the power source apparatus 400 may couple to the base planar surface 406 for positioning. The planar surface 406 may be a floor, a special stand or base, a vertical wall, a non-uniform surface, a ceiling, or any other surface. The power source apparatus 400 has the ability to operate in locations without using too much space. The power source apparatus 400 may couple to a planar surface 406 in a location that humans do not typically use. In other examples, the power source apparatus 400 may hang from cables or other means of positioning to enable robotic devices to charge.

The power source apparatus 400 shown in FIG. 4A may output both a first type of charge 402 and a second type of charge 404. In other examples, the power source apparatus 400 may only output the first type of charge 402 and allow a connection to ground or may only output the second type of charge 404 and allow a connection to ground. In the example that the power source apparatus 400 takes the form of a planar surface such as a sheet, one side of the sheet may have the first type of charge 402 and the other side may have the second type of charge 404. A robotic device may connect to any section of the power source apparatus 400 to receive a charge until the charging process is no longer needed. In examples, a robotic device may charge from the power source apparatus 400 until additional charge is no longer is required, or the robotic device may charge for a set period of time or set amount of charge.

FIG. 4B is another example of a power source apparatus 408. The power source apparatus 408 includes a cylindrical structure with multiple vertical strips alternating a first type of charge terminals 410 and a second type charge terminals 412. The strips may be terminals configured to distribute charge or may be other types of surfaces allowing the transfer of charge. The strips may exist horizontally or at another angle along the power source apparatus 408. The strips of the first type of charge terminals 410 and the second type of charge terminals 412 may be any length, depth, and thickness. In some examples, the power source apparatus 408 may have half the cylinder exist as a first type of charge terminal 410 and the other half exist as a second type of charge terminal 412. Other examples of power source apparatuses may include ground strips or other types of strips. The entire surface of the power source apparatus 408 may not be covered by a charge terminal. In some examples, the cylinder power source apparatus 408 allows robots from 360 degrees around the power source apparatus 408 to connect for a charge at the same time. The power source apparatus 408 of FIG. 4B may operate in the same robotic device charging system as FIG. 4A.

FIG. 4C is an example of another power source apparatus 414 coupled to a planar surface 416 located above the power source apparatus 414. In this example, the power source apparatus 414 is a cylinder with the ends of the cylinder perpendicularly aligned to a ceiling (planar surface 416). In some examples, the power source apparatus 414 may be coupled to the ceiling 416 in order to maximize floor space for robotic devices to operate, but still allow the ability for robotic devices to charge. The power source apparatus 414 may output a first value of charge 420 and a second value of charge 422. In the example, the upper half of the cylinder includes the first value of charge terminals 420 and the bottom half of the cylinder includes the second value of charge terminals 420. In other examples, distribution of the first value of charge 420 and the second value of charge 422 may vary in the power source apparatus 414.

5. Examples of Robotic Device and Power Source Apparatus Interaction

Figure 5:
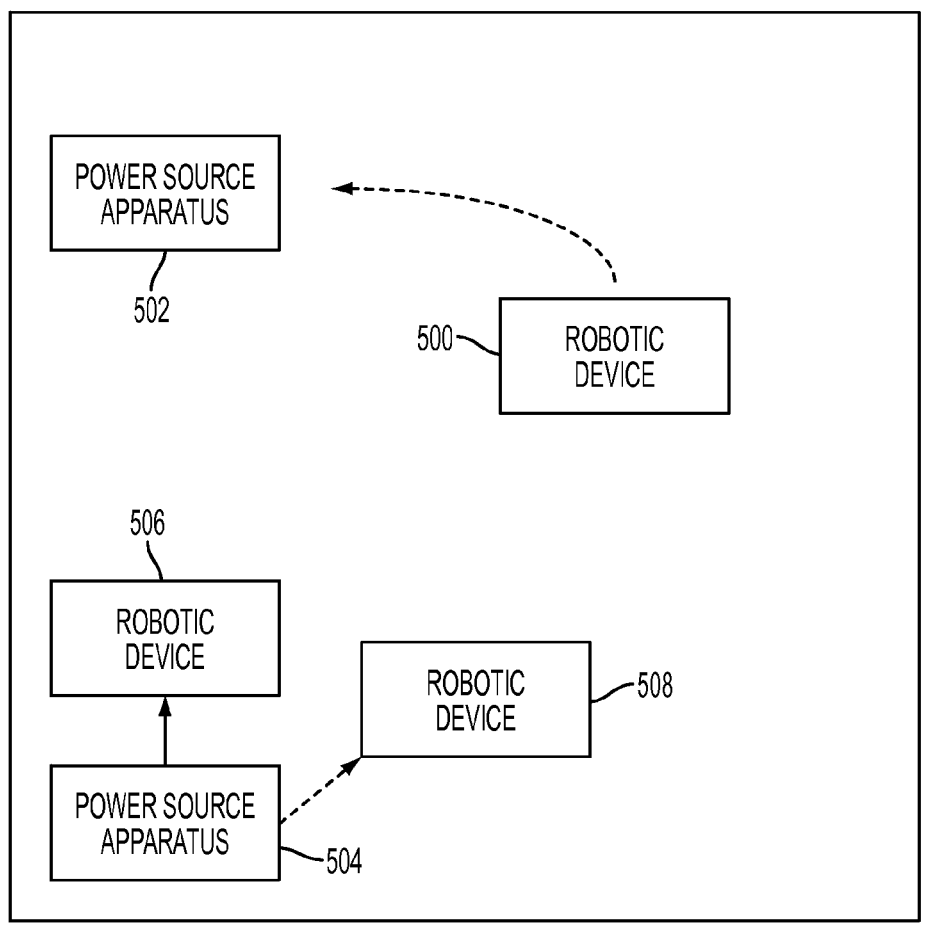
FIG. 5 is a diagram of an example robotic device selecting a power source apparatus.

FIG. 5 is an example conceptual illustration of a robotic device 500 selecting a power source apparatus to charge from. In the example, the robotic device 500 has two local power source apparatuses to choose from 502 and 504. In one embodiment, the robotic device 500 may select the power source apparatus 502, primarily because the other power source apparatus 504 may have limited space to charge due to other robotic devices 506 and 508 currently occupying the power source apparatus 504. The robotic device 500 may analyze the situation, using object recognition for example, and determine that the power source apparatus 502 is a more efficient choice. In another example, the power source apparatus 502 may be located closer to robotic device 500 and therefore require less time for the robotic device 500 to move to receive a charge.

The power source apparatus 502 and the power source apparatus 504 may exist as any type of power source, and may be the same type or different types. In some examples, the power source apparatus 506 and the power source apparatus 504 may coexist in a system with communication between them. Additional power source apparatuses may couple with these two power source apparatuses. In one example, the power source apparatuses may communicate with each other to relay messages and signals, including if each power source apparatus is working properly or if a power source apparatus is occupied, etc.

The robotic devices in FIG. 5 may be numerous devices including the robotic devices disclosed in FIG. 2. Robotic device 500 may have a variety of systems that enable decisions in selecting what power source apparatus to charge from. In some examples, robotic device 500 may send messages or signals to the power source apparatuses and receive messages or signals in response. These messages or signals may include information indicating a certain power source apparatus or to coordinate timing with other robotic devices to prevent overcrowding. The robotic device 500 may also communicate with the other robotic devices for numerous reasons, including location requests.

Figure 6:
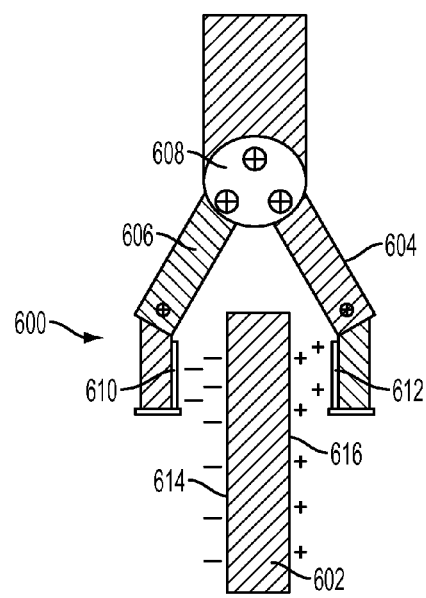
FIG. 6 is a diagram of an example gripper interacting with a power source apparatus.

FIG. 6 is an example conceptual illustration of a robot device member 600 interacting with a power source apparatus 602. In the example, the member 600 includes a gripper with two extending portions from a main joint 608. A right portion 604 includes electrical contacts 612 that are configured to receive positive charge from a positive charge terminal 616 of the power source apparatus 602. A left portion 606 includes electrical contacts 610 that are configured to receive negative charge from a negative charge terminal 614 of the power source apparatus 602. In additional examples, the power source apparatus 602 may take on a plurality of structures.

In the example of FIG. 6, the member 600 is a gripper that is able to close upon a power source apparatus. The member 600 may perform a plurality of functions other than just providing a means to receive charge from the power source apparatus 602. The member 600 may be coupled to the base of a robotic device and may receive instructions from a control unit of the robotic device. In other examples, a member 600 may be a wing, an arm, a hand, or any other structure able to perform functions. Robotic devices may include a plurality of members and the plurality of members may range from the same type to different types. Members may be composed of a plurality of materials, including metal, titanium, plastic, and aluminum. In other examples, the member 600 may include several joints and portions connected to move in a particular motion. The member 600 may apply a specific amount of force upon the power source apparatus 600, including a light amount to barely grasp the apparatus to prevent possible damage. In other embodiments, a robotic device may have multiple robotic members 600 and have one member configured to receive one type of charge and the other member configured to receive another type of charge.

In the example of FIG. 6, the member 600 contains the main joint 608 connecting multiple portions relative to each other. In other examples, the member 600 may contain a plurality of joints or no joints at all. The main joint 608 may help enable a robotic device to perform certain functions. The main joint 608 may be a plurality of joints, including a hinge joint, gliding joint, and ball-and-socket joint, etc. Other types of connections may exist instead of the main joint 608 as well.

The power source apparatus 602 in FIG. 6 may deliver a charge to the gripper through conduction. The power source apparatus 602 may produce a certain value of charge between a set of voltage differences, or may vary on the value of charge. In some examples, the power source apparatus 602 may switch the direction of flow of the charge for the electrical contacts of the member 600 to receive. The member 600 of the robotic device may receive a charge by coupling electrical contacts to the power source apparatus 602. The power source apparatus 602 may provide charge to the member 600 via transfer through an electromagnetic field without requiring the member 600 to physically couple to the power source apparatus 602. In other embodiments, the power source apparatus 602 may transfer charge to the robotic device member 600 via induction or conduction, depending on the abilities of the robotic device. Any power source apparatus may substitute for the power source apparatus 602 in this example, including the power source apparatuses from FIG. 4A-4C. Additional possible power source apparatuses may be a wall socket, wires, and a generator, etc.

Figure 7:
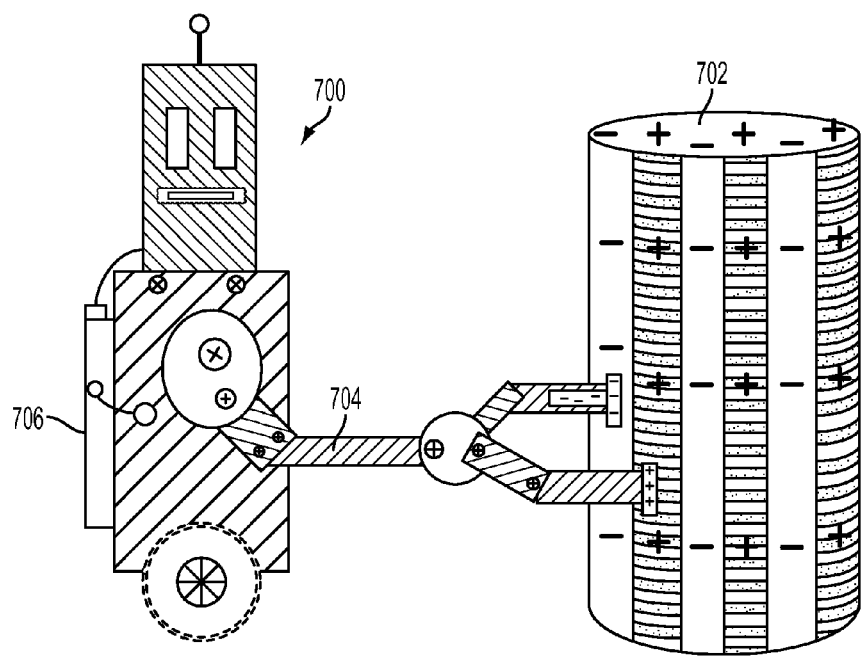
FIG. 7 is a diagram showing an example of a robotic device charging from a power source apparatus.

FIG. 7 is an example conceptual illustration of robotic device 700 interacting with another power source apparatus 702. In the example, the robotic device 700 includes one member 704 coupled to the base of the robotic device 700. The member 704 is coupled to the power source apparatus 702. The member 704 may receive a charge from the power source apparatus 702 and transfer the charge to a battery 706 of the robotic device 700.

The robotic device 700 may perform various functions and tasks. In additional examples, the robotic device 700 may be a different type of robotic device. The robotic device 700 may locate the power apparatus through numerous methods. These methods may include, but are not limited to image recognition, GPS location, and wireless communication. The robotic device 700 may charge on a set schedule or may choose to charge when power levels of the robotic device 700 are low.

In an example, the member 704 of the robotic device 700 is coupled to the base of the robotic device 700 and couples to the power source apparatus 702 to receive charge. The member 704 includes a gripper that functions using joints and portions. The portions move relative to each other and include electrical contacts on the portions to receive charge for the robotic device 700. In FIG. 7, the electrical contacts on one portion of the gripper are configured to receive negative charge from negative charge terminals of the power source apparatus 702. The electrical contacts on the other portion are configured to receive positive charge from positive charge terminals of the power source apparatus 702. The member 704 may select from the plurality of terminals on the power source apparatus 702.

In the example of FIG. 7, the power source apparatus 702 is a cylindrical apparatus with multiple charging terminals. In other examples, the power source apparatus 702 may exist in different forms and charge in different ways.

Figure 8:
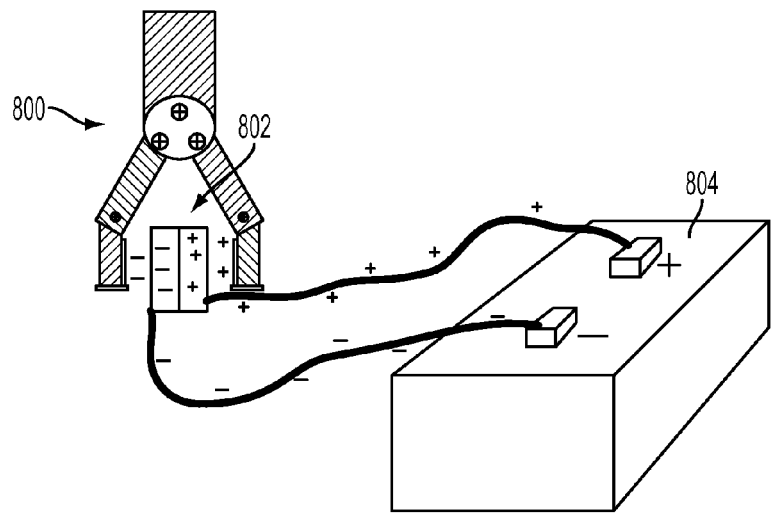
FIG. 8 is a diagram showing another example of a member of a robotic device charging from a power source apparatus.

FIG. 8 is an example of a member 800 charging from a power source apparatus 802 powered by a two-terminal battery 804. In the example, the member 800 of a robotic device may receive charge by coupling to power source apparatus 802 that is powered by the terminals of a battery. The member 800 is similar to the member 600 in FIG. 6.

The battery 804 may provide charge to the power source apparatus 802 via wires extending from terminals of the battery 804. FIG. 8 is an example of a power source apparatus using an external source for at least some power. In other examples, the power source apparatus 802 may charge from different types of batteries 804. In situations where a constant flow of power is unavailable, multiple batteries may power the same power source apparatus 802. These batteries may combine charge by connecting them in series or parallel to the power source apparatus. In the example of FIG. 8, battery 804 may be replaced upon the depletion of ampere-hours. The battery 804 may also be substituted by other forms of charge providers including generators, general electricity from a socket, or other sources.

Figure 9:
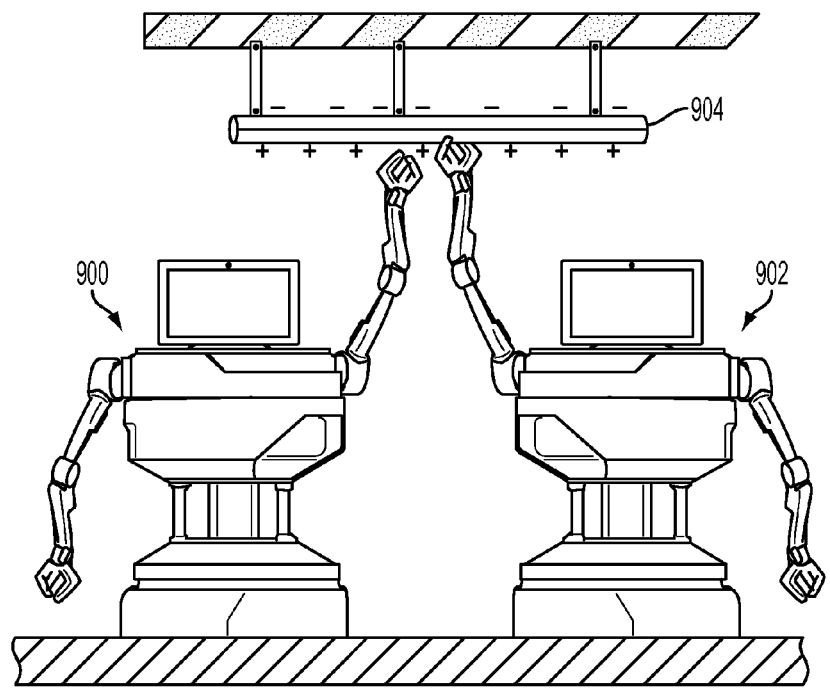
FIG. 9 is a diagram showing an example of a plurality of robotic devices charging from a power source apparatus.

FIG. 9 is an example of a plurality of robotic devices charging from the same power source apparatus. In the example, robotic device 900 and robotic device 902 may both charge from the same power source apparatus 904, which is coupled to a ceiling, for example. Other examples may include a plurality of robotic devices charging from the power apparatus 904.

In other examples, the robotic devices may be different types of robotic devices useful for different functions. Robotic device 900 and robotic device 902 may communicate to help improve functioning and efficiency. In one embodiment, robotic device 900 and robotic device 902 may alternate performing a specific function and charging. During this embodiment, at least one robotic device may perform the desired function at all times, while still allowing the opportunity to charge. Communication between robotic device 900 and robotic device 902 may enable the robotic devices to avoid accidental contact between each other while moving to the power source apparatus 904 to charge. Robotic device 900 and robotic device 902 may continue to perform functions if possible within the location range of the power source apparatus while charging. In some examples, robotic device 900 may charge from the power source apparatus 904 and robotic device 902 may couple to robotic device 900 to receive a charge. In this example, the charge to robotic device 902 may come directly from robotic device 900 or may come from the power source apparatus 904 through the robotic device 900.

The power source apparatus 904 in FIG. 9 may couple to the ceiling of a room or any other planar surfaces. Different types of power source apparatus may substitute for the power source apparatus 904 in the example. The power source apparatus 904 may provide charge to a plurality of robotic devices simultaneously or selectively. Induction, conduction, and other methods of charging may be used by the power source apparatus 904 to charge the robotic devices. The power source apparatus 904 may provide a constant output that constantly stays within a certain range of charge, or may vary depending on the number of robotic devices currently charging. In some examples, the power source apparatus 904 may also include lights to provide lighting to a room while occupying area on the ceiling. The power source apparatus 904 may couple the planar surface in a variety of ways, including by chains, cords, and mechanical supports, etc.

Figure 10:
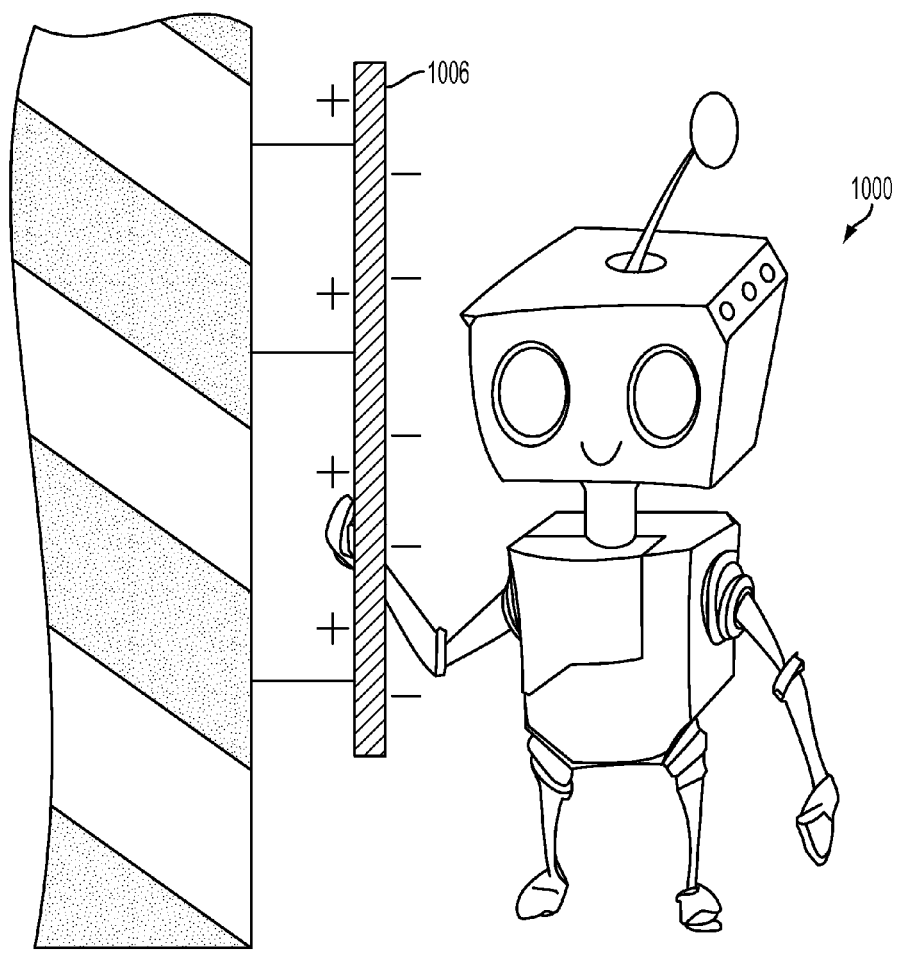
FIG. 10 is a diagram showing an example of a robotic device charging from a power source apparatus.

FIG. 10 illustrates a robotic device 1000 coupling a member to a power source apparatus 1006 attached to a wall. In the example, the gripper at the end of the member of the robotic device 1000 is coupling the power source apparatus 1006 to receive charge. In another example, additional robotic devices may connect to the power source apparatus to receive charge simultaneously. The power source apparatus 1006 may help maximize space by minimizing the footprint of the power source apparatus 1006.

The power source apparatus 1006 may couple to a variety of surfaces in different environments. In other examples, different power source apparatuses may be used including the power source apparatuses in FIGS. 4A-4C. The power source apparatus 1006 may plug in the wall, receive power from a generator or a battery, or receive charge from another apparatus. In other examples, the power source apparatus 1006 may be able to generate power. The power source apparatus 1006 may charge the robotic device 1000 by induction, direct connection of circuitry, or another means to transmit charge.

6. Example Method to Determine if Charge Meets a Threshold

Figure 11:
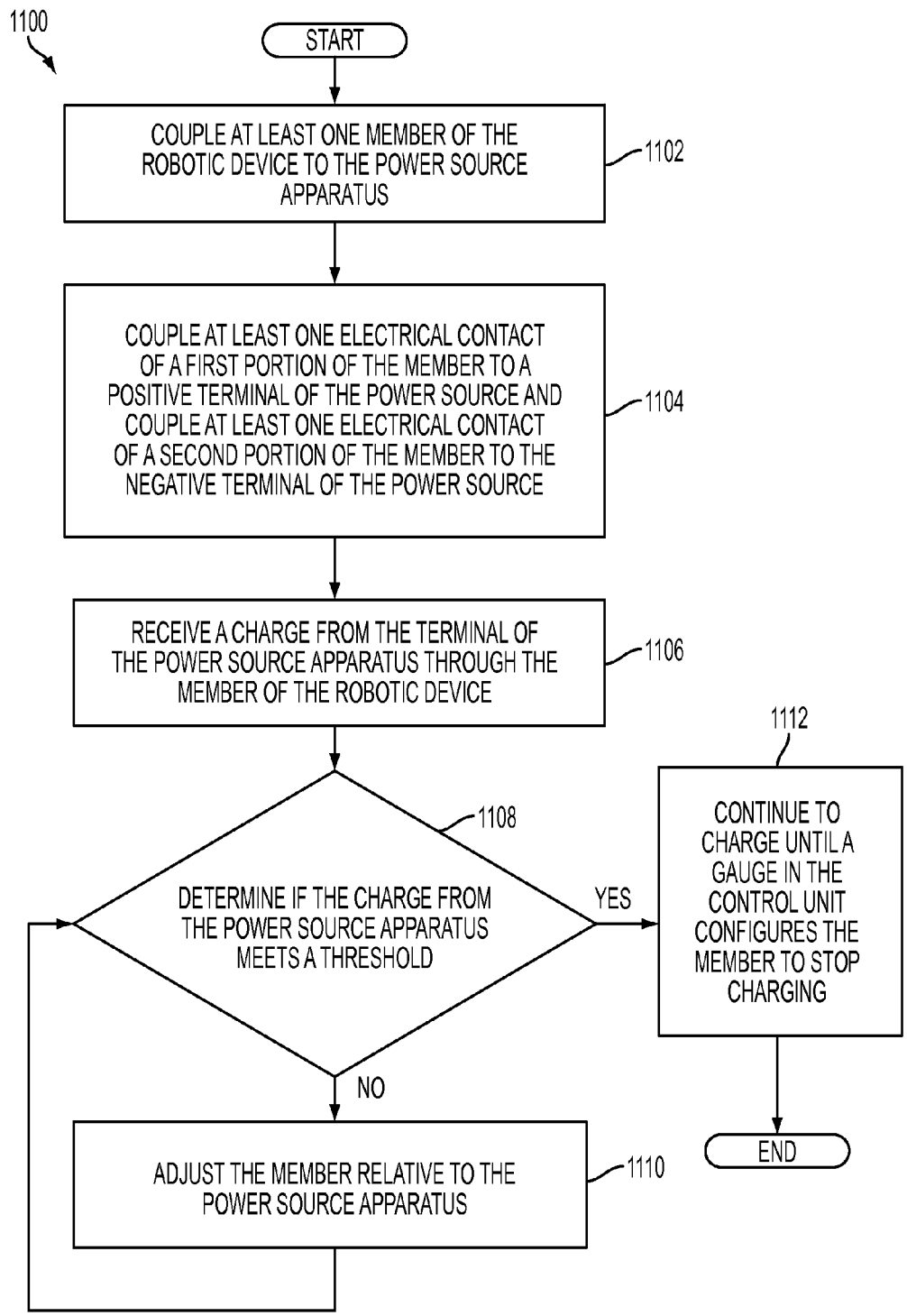
FIG. 11 is a flow chart illustrating an example operation of the robotic device testing if the charge from the power source apparatus meets a threshold.

FIG. 11 is a block diagram of an example method for charging a robotic device, including for example, determining if a charge entering a member of a robotic device meets a threshold level. A robotic device may require a certain amount of charge for a recharge of a battery to occur. Also, to minimize errors, a robotic device may have an ability to determine that a power source apparatus is no longer functional to properly provide a certain level of charge. In addition, a robotic device may need to reposition the electrical contacts on a member to properly connect to the charging terminal of a power source apparatus. Therefore, method 1100 may be performed to charge from a power source apparatus. Method 1100 shown in FIG. 11 presents an embodiment of a method that, for example, could be used with the system 100 and may be performed by a device, such as any devices illustrated in FIGS. 2-3B, or components of the devices. The various blocks of method 1100 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1102, the method 1100 includes coupling a member of a robotic device to a power source apparatus. For example, a robotic device may move to the power source apparatus to contact an arm of the robotic device to the power source apparatus to receive charge. In another example, a robotic device may couple other structures like the face of the robotic device to a power source apparatus to receive charge. The member of the robotic device that couples to the power source apparatus may have different main functions to perform may receive charge as an additional function other than the main functions of the member. The robotic device may be configured to return to a specific power source apparatus, or may be configured to locate and access a closest power source apparatus. In some examples, any member of the robotic device may couple to the power source apparatus including a leg, arm, wing, and mouth, etc. In addition, a robotic device may couple multiple members to the power source apparatus. In some embodiments, multiple members may function together in order to receive a charge for the robotic device. For example, one member may be configured to receive the charge while another member of the robotic device connects to a ground connection.

At block 1104, the method 1100 includes the robotic device coupling at least one electrical contact of a first portion of the member to a first type of charge terminal of the power source and coupling at least one electrical contact of a second portion of the member to a second type of charge terminal of the power source. In some examples, the robotic device may couple only an electrical contact to a positive terminal of the power source without coupling an electrical contact to a negative terminal or ground terminal. In another example, the robotic device may couple an electrical contact to only the negative terminal. In other embodiments, a robotic device may couple an electrical contact that is configured to receive charges at different rates, values, and orientations. A robotic device may include multiple isolated electrical contacts that are able to be configured to connect to a positive or negative terminal. In this example, the robotic device may appropriate contacts to match the power source apparatus and connect them properly to the charging circuit.

At block 1106, the method 1100 includes receiving a charge from the terminal of the power source through the member of the robotic device. For example, a robotic device may receive charge from the power source through the member and store the charge in a battery of the robotic device. In another example, the robotic device may receive a charge wirelessly from the power source apparatus via an electromagnetic field. The charge may transfer in a variety of ways, including induction, and conduction, etc. The charge may enter the robotic device at various rates, depending on settings of the power source apparatus, amount of charge produced by the power source apparatus, or the rate a robotic device accepts charge, etc.

At block 1108, the method 1100 includes determining if the charge being received from the power source apparatus meets a threshold. By determining if the charge meets a threshold, the robotic device may determine if enough charge is being received from the power source apparatus by the robotic device. In some examples, the alignment of the electrical contacts of the robotic device may not match the terminals of the power source apparatus and require an adjustment of the contacts by the robotic device. The robotic device may determine if proper charge is being received in numerous ways. In one example, the robotic device may compare the charge value being received from the power source apparatus to a predetermined value that is stored in the memory of the robotic device. In cases that the robotic device receives zero charge during the comparison from the power source apparatus, the robotic device may perform a predetermined number of adjustments of the contacts to attempt to receive a charge. In another example, the robotic device may measure the charge received from the power source apparatus over a period of time. The robotic device may be able to determine if enough charge is being received or if a repositioning may be required.

In the case that the robotic device determines that the charge from the power source apparatus does not meet a threshold, the robotic device may adjust the member relative to the power source apparatus as in block 1110. Adjusting the member may require the robotic device moving the member a small distance on the power source apparatus. This small adjustment may allow electrical contacts to properly align with charging terminals on a powers source apparatus. In another example, adjusting the member may require the robotic device to completely recouple the member to the power source apparatus. The electrical contacts may require more than a slight adjustment to properly receive the charge for the power source apparatus so as to align with the various contacts of the power source apparatus. After adjusting the member of the robotic device relative to the power source apparatus as in block 1110, the method returns to block 1108 to determine if the charge from the power apparatus meets a threshold again. If the charge does not meet a threshold, the method repeats block 1110 to adjust the member of the robotic device relative to the power source apparatus. In some embodiments, the robotic device may stop attempting to couple to the particular power source apparatus and search for another one. The robotic device may stop attempting after a predetermined number of attempts or a predetermined amount of time. This may prevent a robotic device from constantly trying to connect to a power source apparatus that is not functioning properly or powered-off. In the case that the charge from the power source apparatus meets a threshold, the method continues to block 1112.

At block 1112, the method 1100 includes the robotic device continuing to charge until a gauge in the control unit configures the member to stop charging. In examples, the robotic device may continue to charge for a specific length of time, or may charge until the battery of the robotic device reaches a certain level of charge. The robotic device may also determine that other robotic devices may need to charge immediately and cause the robotic device to take a break to allow others to charge. Once a robotic device discontinues charging, the robotic device may return to a previous function prior to receiving a charge. In some examples, robotic devices may have predetermined routines configured so that some robotic devices are charging while others are performing functions to prevent overcrowding at the power source apparatus or a lack of continual performance from the robotic devices.

7. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:
1. A method comprising:
   determining, by a computing system of a robotic device, that a power level associated with the robotic device is below a threshold level;

based on determining that the power level associated with the robotic device is below the threshold level, coupling, by the computing system of the robotic device, a mechanical manipulator of the robotic device to a terminal of a power source, wherein the mechanical manipulator includes an elongated arm or leg of the robotic device configured to perform one or more grip operations, and wherein coupling the mechanical manipulator to the terminal of the power source comprises coupling a first electrical contact and a second electrical contact of the mechanical manipulator to respective corresponding portions of the terminal of the power source by performing a respective grip operation of the one or more grip operations; and responsive to coupling the mechanical manipulator of the robotic device to the terminal of the power source, receiving, at the robotic device, an electrical charge from the power source through the mechanical manipulator.

2. The method of claim 1, further comprising the robotic device identifying the power source via object recognition in an image captured by the robotic device.

3. The method of claim 1, wherein the mechanical manipulator includes a plurality of portions coupled via one or more joints, and is configured to move the plurality of portions relative to each other as well as relative to the one or more joints.

4. The method of claim 1, further comprising:
making a determination that the received electrical charge is below a threshold; and
repositioning the first electrical contact and the second electric contact of the mechanical manipulator relative to the terminal of the power source.

5. The method of claim 1, wherein the mechanical manipulator is the elongated arm of the robotic device, and wherein the first electrical contact and the second electrical contact have respective positions on an actuator of the elongated arm.

6. The method of claim 1, wherein the robotic device is configured to uncouple the mechanical manipulator upon receiving a threshold amount of electrical charge.

7. A robotic device comprising:
a mechanical manipulator coupled to a base of the robotic device configured to perform one or more grip operations, wherein the mechanical manipulator includes an elongated arm or leg of the robotic device and includes a first portion and a second portion movably coupled relative to each other, the first portion and the second portion of the member including electrical contacts and the first portion includes a first electrical contact configured to receive a first type of charge and the second portion includes a second electrical contact configured to receive a second type of charge; and
a control unit configured to control movement of the mechanical manipulator, wherein movement of the mechanical manipulator includes coupling the first electrical contact and the second electrical contact of the mechanical manipulator to respective portions of a terminal of a power source by performing a respective grip operation of the one or more grip operations to receive electrical charge at the robotic device through the mechanical manipulator.

8. The robotic device of claim 7, wherein the control unit is configured to execute instructions to configure movement of the mechanical manipulator.

9. The robotic device of claim 7, wherein the control unit comprises a gauge configured to measure an amount of charge in the robotic device.

10. The robotic device of claim 7, wherein the mechanical manipulator of the robotic device includes a gripper with a first portion and a second portion.

11. The robotic device of claim 7, wherein the control unit of the robotic device is configured to make a determination that the charge entering the mechanical manipulator of the robotic device is below a threshold, and to reposition the mechanical manipulator relative to the terminal of the power source.

12. The robotic device of claim 7, wherein the control unit of the robotic device is configured to make a determination that the charge available for use in the robotic device is above a threshold.

13. A system comprising:
a plurality of robotic devices, wherein a given robotic device of the plurality of robotic devices includes at least one mechanical manipulator configured to perform one or more grip operations, and wherein the at least one mechanical manipulator includes an elongated arm or leg of the robotic device that includes a first electrical contact configured to receive a first type of charge and a second electrical contact configured to receive a second type of charge having respective positions on the mechanical manipulator; and
a power source apparatus configured to couple to a planar surface and including a plurality of terminals located on the power source apparatus, wherein a given terminal of the plurality of terminals is configured to provide an electrical charge, the electrical charge being transferable to the at least one mechanical manipulator of the given robotic device of the plurality of robotic devices coupling to the given terminal of the plurality of terminals via a respective grip operation of the one or more grip operations.

14. The system of claim 13, wherein the power source apparatus is a planar surface having a first side and a second side.

15. The system of claim 14, further comprising the first side of the planar surface having a first type of charge and the second side having a second type of charge.

16. The system of claim 13, wherein the power source apparatus is configured to constantly output a charge within an optimal range.

17. The system of claim 13, wherein the power source apparatus is configured to increase a charge level when at least one member of a robotic device couples to the power source apparatus.

18. The system of claim 13, wherein the power source apparatus is configured to charge through induction.

19. The system of claim 13, wherein the power source apparatus is configured to couple to a ceiling of a room.

* * * * *